May 26, 1959
T. ROSS
2,887,775
MULTIPLE DEGREE GAGE
Filed Sept. 24, 1954
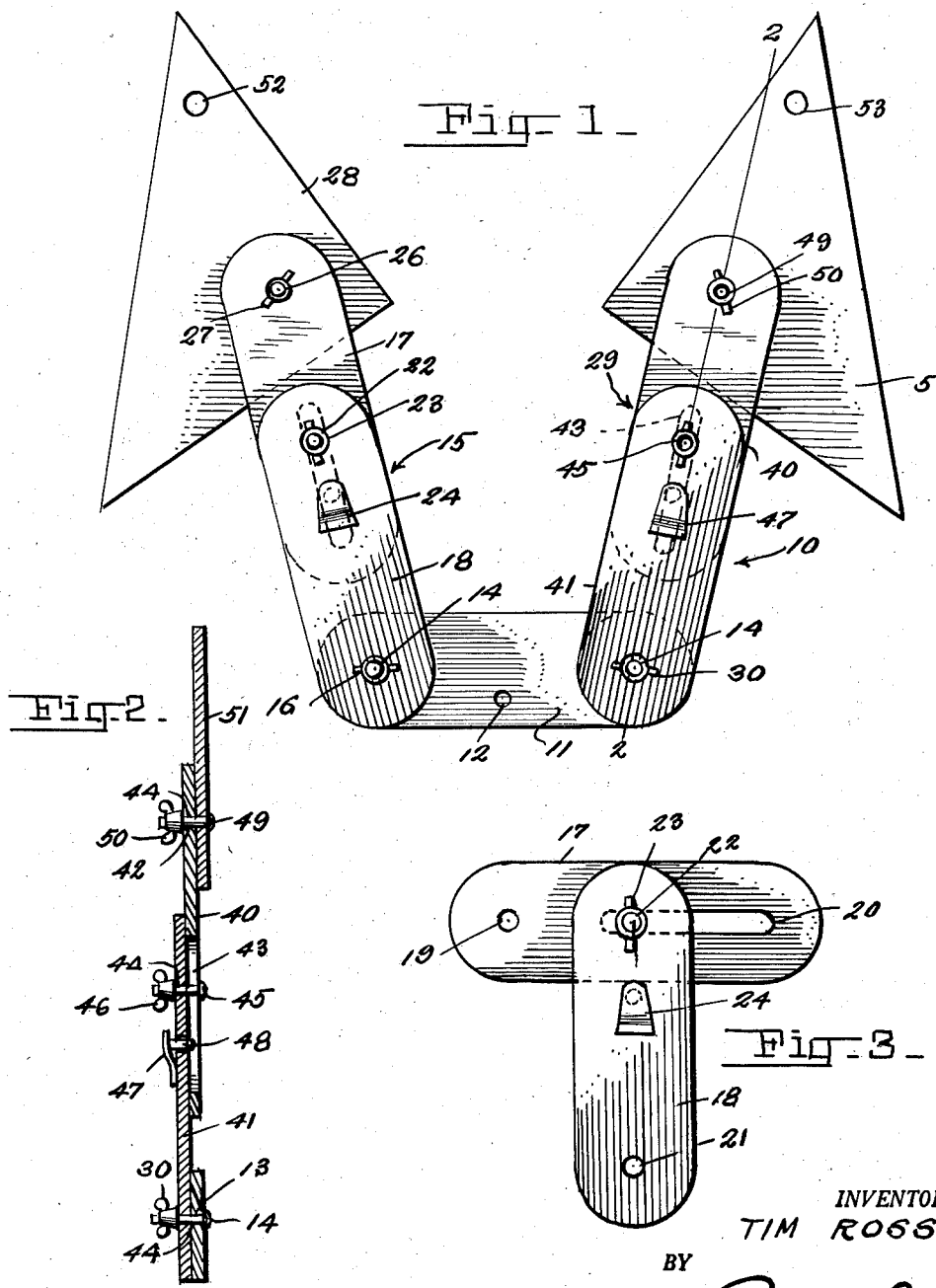
INVENTOR.
TIM ROSS
BY
Patrick D Beaver
ATTORNEY

United States Patent Office 2,887,775
Patented May 26, 1959

2,887,775

MULTIPLE DEGREE GAGE

Tim Ross, Los Gatos, Calif.

Application September 24, 1954, Serial No. 458,195

1 Claim. (Cl. 33—98)

This invention relates to improvements in geometrical instruments and more particularly to improvements in degree gages.

An object of the invention is to provide a degree gage which by its peculiar arrangement of parts will give the user thereof the availability of a multiplicity of angles and construction degrees whereby all existing problems as to measurements of figures in degrees, bevels or irregular spacing and angles is simplified.

The degree gage embodying the invention will by its general construction provide a perfect fit and joint in all imperfect spacing where existing degrees of angles are set.

Another object of the invention is to provide a degree gage for use with multiple angles to provide a perfect space and degree of angle for cuts in octagon construction, perfect circles and arches.

Due to the multiplicity of angles and degrees that are available with the degree gage of the present invention there is no need for the inscribing of degrees or figures upon its outer surface.

A further object of the invention is to provide a degree gage that is so simple in construction that it can be quickly adjusted to perform a perfect job on all types of degree work. The ordinary layman can easily understand its operation and the use thereof will facilitate operation and save time.

With other objects and advantages in view the invention consists of the minor details of construction, arrangement and combination of parts more fully hereinafter described, claimed and illustrated in the accompanying drawing in which:

Fig. 1 is an elevational plan view of a degree gage embodying the invention;

Fig. 2 is a sectional view on the line 2—2 of Fig. 1; and

Fig. 3 is an elevational plan view of a portion of the degree gage of Fig. 1.

Referring more in detail to the drawing, wherein like parts are designated by like reference numerals a degree gage embodying the invention is generally indicated by the reference numeral 10.

The degree gage 10 comprises a central bar 11 having a central aperture 12 and apertures 13 adjacent the outer ends thereof. A bolt 14 enters each of the apertures 13 and one end of an arm 15 is connected to a bolt 14 by a wing nut 16.

The arm 15 comprises a pair of bars 17 and 18, respectively, and the bar 17 is provided at one end with an aperture 19 and at the other end with an axially extending elongated slot 20. The bar 18 is provided at its opposite ends with apertures 21 and it is one of these apertures that receives the bolt 14.

The other aperture 21 receives a bolt 22 which is mounted in the slot 20 in the bar 17 and a wing nut 23 connects the two bars as a unit.

A spring member 24 having a detent 25 thereon is fixed to the bar 18 and when the bars are in the position of Fig. 1 the detent 25 enters the slot 20 in the bar 17 and retains the bars 17 and 18 in fixed alined relation with each other.

A bolt 26 passes through the apertures 19 of the bar 17 so that a wing nut 27 will mount a triangular shaped plate 28 on the outer end of the arm 15.

A similar arm 29 is connected by a wing nut 30 to a bolt 14 mounted in one of the apertures 13 in the bar 11. The arm 39 is of similar construction to the arm 15 and comprises a pair of bars 40 and 41, respectively. The bar 40 is similar in construction to bar 17 and contains an aperture 42 and an elongated slot 43. The bar 41 is similar in construction to the bar 18 and is provided at its opposite ends with apertures 44 and it is one of these apertures that receives the bolt 14.

The other aperture 44 receives a bolt 45 which is mounted in the slot 43 in the bar 40 and a wing nut 46 connects the two bars as a unit.

A spring member 47 similar to spring member 24 and having a detent 48 thereon is fixed to the bar 47 and when the bars are in the position of Fig. 1 the detent 48 enters the slot 43 in the bar 40 and retains the bars 40 and 41 in fixed alined relation with each other.

A bolt 49 passes through the aperture 42 in the bar 40 so that a wing nut 50 will mount a triangular shaped plate 51 on the outer end of the arm 29.

The plate 28 is provided at one angle with an aperture 52 and the plate 51 is provided at one angle with an aperture 53, the plates being connected to the arms in reverse relation to each other.

The bar 11 performs as a lever for quick spacing and the aperture 12 is used as a center in circular and arch work.

The bars of the arms may be adjusted at right angles to each other, as shown in Fig. 3, to provide a perfect T formation. The slots in the bars 17 and 40 permit elongation of the arms 15 and 29 as desired.

The aperture in the angle plates permits drawing circles and arch work when used as a center and when the plates are placed in abutting relation to each other a perfect 90° angle is obtained.

The angle plates provide the point of decision of a multiplicity of degree or angle cuts.

In the use of the gage for construction work, it is understood that each of the triangular shaped plates 28 and 51 include a base, a side and a hypotenuse. While there are many ways in which the gage may be used, the following example will be used to illustrate one method of producing an octagon cut.

The plates 28 and 51 are pivoted on the bolts 26 and 49 until the bases are in parallel relation to each other. Then the bars 18 and 29 are pivoted toward each other on the bolts 14 until the bases of the plates 28 and 51 are in contact with each other. Using the sides as a guide, a straight horizontal line may be drawn the width of the octagon cut to be made. The center of the horizontal line is then indicated and the gage is placed so that a vertical line equalling the height of the octagon cut can be drawn through the center of the horizontal line.

Parallel vertical lines of predetermined length corresponding to the size of the octagon cut can be drawn at the opposite ends of the horizontal line and parallel horizontal lines can be drawn at the opposite ends of the vertical line. Then by moving the plates 28 and 51 until the bases of the plates 28 and 51 are aligned with the vertical lines at the ends of the horizontal line and the points formed by the base and hypotenuse of the plates 28 and 51 lies upon the lower end points of the vertical lines. Then lines are drawn along the hypotenuse of both of the plates 28 and 51 until the lines thus drawn intersect the bottom horizontal line and the vertical lines at the opposite ends of the horizontal line, thus completing the bottom part of the octagon. In a similar manner the upper part of the octagon is drawn with the use of the gage.

Also if the hypotenuses of the plates 28 and 51 are placed in contact with each other a square may be drawn. Thus, by placing the bases of the plates 28 and 51, the sides and bases or the sides, bases or hypotenuse in contact with each other, various angles and figures may be drawn, as set forth above.

Thus, in the field of construction, the gage may be used to make outlines for octagon cuts and circular cuts whereby arches, window openings etc. may be cut in a quick and efficient manner with a perfect fit to provide a joint with perfect spacing.

Many and various positions may be obtained by the adjustment of the various elements of the gage and it is believed that it will not be necessary to go into further detail with regard to the use of the gage for such uses are many and varied.

It is believed therefore that the operation of the gage will be apparent to those skilled in the art and it is to be understood that changes in the minor details of construction, arrangement and combination of parts may be resorted to without departing from the spirit of the invention and the scope of the appended claim.

Having thus described the invention what is claimed as new and desired to be secured by Letters Patent is:

A device of the character described comprising a central bar, an arm pivotally connected to each end portion of said central bar, a triangular plate pivotally connected to the outer end portion of each arm, said plates each having a right angular apex corner, said arms each being formed of an inner bar and an outer bar, said outer bar having a longitudinal slot therein, said inner bar having a bolt extending therethrough and through the slot of the associated outer bar, said inner bars each having an opening therein centrally disposed with relation to its sides, a pin freely mounted in said opening, and a spring affixed to one end of said pin and mounted upon said inner bar and adapted to normally urge the free end of said pin into the slot of the associated outer bar.

References Cited in the file of this patent

UNITED STATES PATENTS

| | | |
|---|---|---|
| 94,814 | Fales | Sept. 14, 1869 |
| 110,316 | Wisner | Dec. 20, 1870 |
| 1,053,757 | Tucker | Feb. 18, 1913 |
| 1,091,332 | Hart | Mar. 24, 1914 |
| 1,205,687 | Verhey et al. | Nov. 21, 1916 |
| 1,269,509 | Reeder | June 11, 1918 |
| 1,483,761 | Youngblood | Feb. 12, 1924 |
| 1,809,401 | Cattell | June 9, 1931 |
| 2,443,672 | Allen | June 22, 1948 |